Inventor:
William Edward Prescott

UNITED STATES PATENT OFFICE.

WILLIAM EDWARD PRESCOTT, OF LONDON, ENGLAND, ASSIGNOR TO JOSEPH BAKER AND SONS LIMITED, OF LONDON, ENGLAND.

MACHINE FOR BREAKING COCOA CAKE OR THE LIKE.

1,421,560.  Specification of Letters Patent.  Patented July 4, 1922.

Application filed July 16, 1920. Serial No. 396,734.

*To all whom it may concern:*

Be it known that I, WILLIAM EDWARD PRESCOTT, of Harlesden, London, N. W., England, engineer, have invented certain new and useful Improvements in Machines for Breaking Cocoa Cake or the like, of which the following is a specification.

This invention relates to machines for breaking cocoa cake or the like.

In machines for this purpose as hitherto made in which toothed rollers are provided to grip and break up the cake as it is drawn between them by the gripping action of the teeth, the latter often fail to grip the cake which has then to be pushed forward manually, necessitating supervision and attended by danger to the workman.

In the improved machine of the present invention means are employed whereby the distance between the peripheries of the rollers is caused to vary periodically thus ensuring that the rollers shall grip the cake not only when the latter is first inserted but during its passage between the rollers until the cake has fully passed between. This is effected by making the roller oval in section.

Heretofore such machines have usually comprised two pairs of rollers placed one pair above the other, the lower pair having finer teeth than the upper pair.

In the improved machine one of the rollers may be dispensed with, thereby making the machine more compact and of less height, by employing three rollers only, placed with their axes in three superposed planes, the uppermost roller being preferably coarse toothed and co-acting with a finer toothed roller on the intermediate plane, and the latter again with a third fine toothed roller on the lowest plane. The uppermost roller is then operated or made according to the method hereinbefore described.

Figure 1:
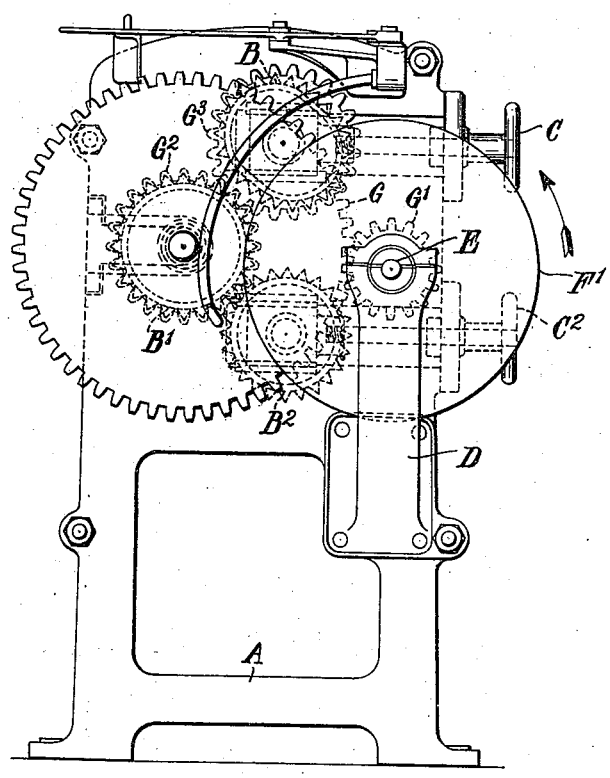
Figure 2:
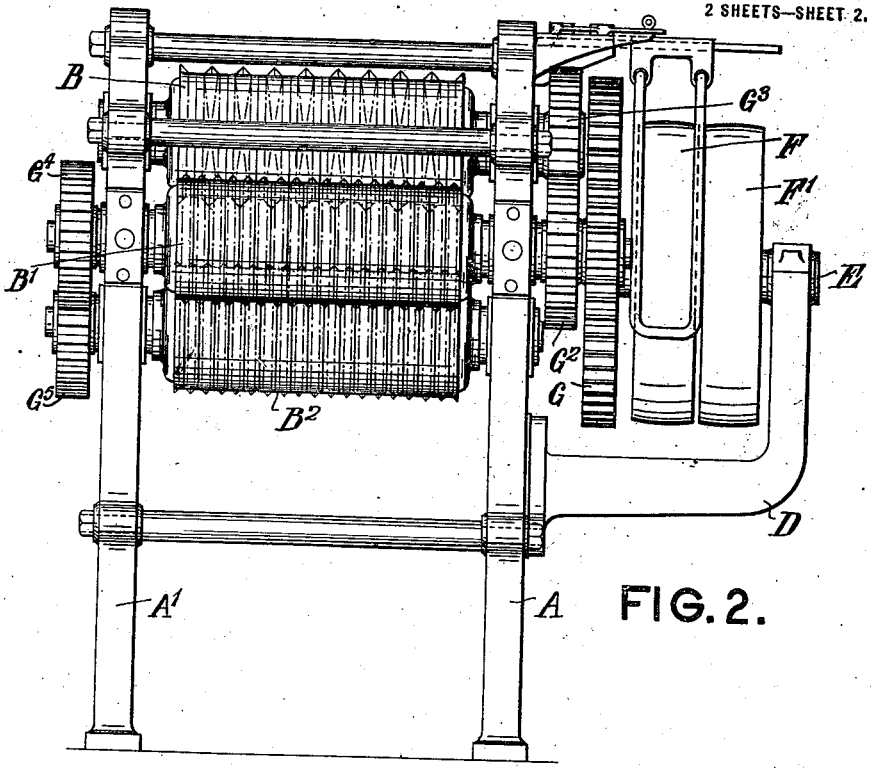
Figure 3:
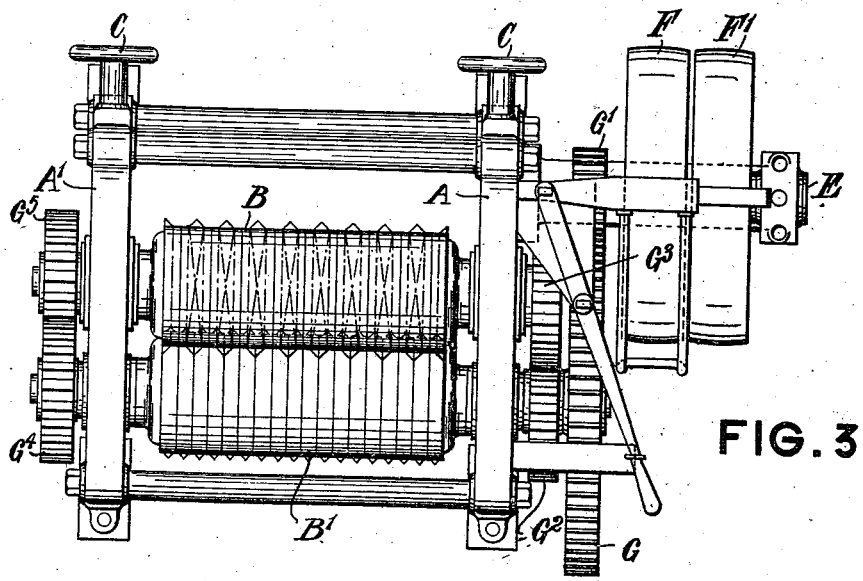

In the annexed drawing Fig. 1 is an end elevation, Fig. 2 a side elevation, and Fig. 3 a plan of a machine constructed according to the present invention in which the uppermost roller is slightlly oval in section.

Certain portions of the machine are indicated in dotted lines or omitted from some of the figures for the sake of clearness.

A $A^1$ are castings suitably connected together to form a frame for the bearings of the shafts of the three rollers B $B^1$ and $B^2$. The bearings of rollers B and $B^2$ are carried in boxes sliding in guide ways in the frame and adjustable by screws C $C^2$. The toothing of the rollers B $B^1$ and $B^2$ is not illustrated, being of the usual known character, D is an arm assisting to support the drive shaft E on which are fast and loose pulleys F $F^1$ and a pinion $G^1$ meshing with gear wheel G on the shaft of roller $B^1$. A further gear wheel $G^2$ also on the shaft of roller $B^1$ engages with gear wheel $G^3$ on the shaft of roller B and at the other end a gear wheel $G^4$ on the shaft of roller $B^1$ gears with gear wheel $G^5$ on the shaft of roller $B^2$.

In the example illustrated in Figs. 1 to 3, the roller B is oval in section and in its revolution its surface recedes from and approaches that of roller $B^1$, thus ensuring that the cake shall be periodically gripped and fed between the rollers.

In describing the roller B as of oval or circular section, it will be understood that this refers to the general or average form of its surface since the roller is in fact toothed as is customary with rollers used for the purpose of breaking cocoa cake or the like.

What I claim as my invention and desire to secure by Letters Patent of the United States is:—

A machine for breaking cocoa cake or like material comprising three toothed rollers disposed with their axes in three superposed planes and cooperating for passage of the material between them, the first roller cooperating with the second roller, and the second with the third, one of the upper pair of rollers being of a general oval form and section in order that during rotation of said rollers the width of space between said upper pair of rollers is periodically varied.

In witness whereof I have signed this specification in the presence of two witnesses.

WILLIAM EDWARD PRESCOTT.

Witnesses:
 H. PETER VENN,
 JOHN VENN.